(12) United States Patent
Brewer et al.

(10) Patent No.: US 11,408,301 B2
(45) Date of Patent: Aug. 9, 2022

(54) FLOW CONTROL NOZZLE

(71) Applicant: Claverham Ltd., Solihull (GB)

(72) Inventors: Paul Brewer, Bristol (GB); Reg Raval, North Somerset (GB); Suat Bekircan, Bath (GB)

(73) Assignee: CLAVERHAM LTD., Solihull (GB)

( * ) Notice: Subject to any disclaimer, the term of this patent is extended or adjusted under 35 U.S.C. 154(b) by 333 days.

(21) Appl. No.: 16/423,522

(22) Filed: May 28, 2019

(65) Prior Publication Data

US 2019/0390562 A1 Dec. 26, 2019

(30) Foreign Application Priority Data

Jun. 21, 2018 (EP) .................................... 18275085

(51) Int. Cl.
| | |
|---|---|
| *F01D 17/16* | (2006.01) |
| *B05B 1/00* | (2006.01) |
| *F01D 9/02* | (2006.01) |
| *F15B 13/043* | (2006.01) |
| *F15B 13/04* | (2006.01) |

(52) U.S. Cl.
CPC ................ *F01D 17/16* (2013.01); *B05B 1/00* (2013.01); *F01D 9/02* (2013.01); *F05D 2270/303* (2013.01); *F15B 13/0436* (2013.01); *F15B 2013/0409* (2013.01)

(58) Field of Classification Search
CPC .......... F15B 13/0436; F15B 2013/0409; F16K 31/002; F02M 61/18; F02M 2200/22; F02M 69/18; F02M 61/047; F02M 61/166; F02M 2200/21; B05B 1/00; F15D 1/08
See application file for complete search history.

(56) References Cited

U.S. PATENT DOCUMENTS

| | | | | |
|---|---|---|---|---|
| 2,111,466 A | * | 3/1938 | Wunsch .............. | F15B 13/0436 137/83 |
| 2,717,611 A | * | 9/1955 | Lerousseau ............... | F15B 9/06 137/85 |
| 3,286,719 A | * | 11/1966 | Myers ................... | F16K 31/006 137/83 |

(Continued)

FOREIGN PATENT DOCUMENTS

| | | |
|---|---|---|
| DE | 19808068 A1 | 9/1999 |
| DE | 10056039 A1 | 5/2002 |

(Continued)

OTHER PUBLICATIONS

Extended European Search Report for International Application No. 18275085.1 dated Dec. 5, 2018, 7 pages.

(Continued)

*Primary Examiner* — Kun Kai Ma
(74) *Attorney, Agent, or Firm* — Cantor Colburn LLP

(57) ABSTRACT

There is disclosed a flow control nozzle for controlling the flow of an incompressible fluid, the flow control nozzle having a flow area and comprising a deformable element comprising a shaped memory alloy (SMA) material wherein within a range of operating temperatures the SMA material is configured to reduce the flow area of the flow control nozzle as the operating temperature increases. The flow control nozzle is thus able to dynamically compensate for changes in operating temperature in order to maintain a constant flow.

11 Claims, 4 Drawing Sheets

(56) References Cited

U.S. PATENT DOCUMENTS

| | | | |
|---|---|---|---|
| 4,253,611 A | | 3/1981 | Hart |
| 5,156,189 A | * | 10/1992 | Tranovich ............. F15B 13/043 137/625.63 |
| 5,984,258 A | | 11/1999 | Knebel et al. |
| 6,186,123 B1 | | 2/2001 | Martin et al. |
| 6,814,309 B2 | | 11/2004 | Franz et al. |
| 7,510,131 B2 | | 3/2009 | Geskin et al. |
| 8,757,508 B2 | | 6/2014 | Haasz et al. |
| 9,267,382 B2 | | 2/2016 | Szwedowicz et al. |
| 2005/0056710 A1 | | 3/2005 | Sekiya et al. |
| 2007/0090208 A1 | * | 4/2007 | Geskin ...................... B05B 7/04 239/600 |
| 2009/0118981 A1 | * | 5/2009 | Kondo ................ F02M 57/005 701/104 |
| 2014/0224903 A1 | * | 8/2014 | Fujino ................ F02M 21/0269 239/585.1 |
| 2015/0210397 A1 | * | 7/2015 | Blom ..................... B64D 13/00 454/76 |
| 2017/0152966 A1 | | 6/2017 | Philips et al. |
| 2017/0370483 A1 | * | 12/2017 | Ohshio ............... F15B 13/0436 |
| 2017/0370484 A1 | * | 12/2017 | Ohshio ................. F16K 11/065 |
| 2017/0370496 A1 | * | 12/2017 | Ohshio ................. F16K 11/072 |
| 2018/0347712 A1 | * | 12/2018 | Jaskiewicz .......... F15B 13/0436 |

FOREIGN PATENT DOCUMENTS

| | | |
|---|---|---|
| DE | 102007037219 A1 | 2/2009 |
| EP | 2025924 A2 | 2/2009 |
| JP | S5862169 U | 4/1983 |
| JP | 4086368 A | 3/1992 |
| JP | 04224613 A * | 8/1992 |
| JP | 4224613 A | 8/1992 |
| JP | 2001207936 A | 8/2001 |
| JP | 2009002171 A | 1/2009 |
| WO | 9319313 A2 | 9/1993 |

OTHER PUBLICATIONS

Abstract for EP2025924 (A2), dated Feb. 18, 2009, 1 page.
Abstract for JP2001207936 (A); dated Aug. 3, 2001, 1 page.
Abstract for JP2009002171 (A), dated Jan. 8, 2009, 1 page.
English Translation of First CN Office Action for Application No. 201910540726.7, dated Mar. 7, 2022, 4 pages.
First CN Office Action for Application No. 201910540726.7, dated Mar. 7, 2022, 8 pages.

* cited by examiner

FLOW CONTROL NOZZLE

FOREIGN PRIORITY

This application claims priority to European Patent Application No. 18275085.1 filed Jun. 21, 2018, the entire contents of which is incorporated herein by reference.

TECHNICAL FIELD

The present disclosure relates generally to devices for controlling fluid flow, and in particular to devices for controlling a flow of an incompressible fluid.

BACKGROUND

Within a typical jet pipe servo valve the pressure to the second stage spool or to the servo is controlled by flow impingement from a precision jet nozzle. Accordingly, it is desirable to try to maintain a substantially constant flow of hydraulic fluid from the jet nozzle since any fluctuations in the flow may degrade the performance of the jet pipe servo valve. However, this can often be difficult as the viscosity of the fluid is closely dependent on temperature. The performance of existing jet pipe designs can therefore be highly susceptible to changes in operating temperature. Similar problems can be found in various other flow control applications where the flow is sensitive to viscosity effects. For instance, another example would be a fuel control nozzle within a diesel engine.

SUMMARY

From a first aspect there is provided a flow control nozzle for controlling the flow of an incompressible fluid, the flow control nozzle having a flow area and comprising a deformable element comprising a shaped memory alloy (SMA) material wherein within a range of operating temperatures the SMA material is configured to reduce the flow area of the flow control nozzle as the operating temperature increases.

Thus, in embodiments, a SMA material is used to control the flow in order to compensate for variations in operating temperature. Particularly, the SMA material may be used to control the flow in order to compensate for temperature dependent variations in the viscosity of the incompressible fluid that is being provided by the flow control nozzle. For instance, the flow control nozzle has a flow area through which the fluid flows in use and which flow area therefore determines (along with the flow velocity) the flow rate. As the operating temperature increases, the viscosity of the fluid will typically decrease and if this were not compensated for the flow rate would therefore increase. So, any variations in operating temperature would lead to a variation in flow rate. By contrast, according to embodiments the flow area may be reduced as the operating temperature increases in order to reduce variations in the flow rate over the range of operating temperatures.

In particular, the SMA material may be configured to reduce the flow area of the flow control nozzle as the operating temperature increases in order to maintain a (more) substantially constant flow rate over the range of operating temperatures. In embodiments, the flow control nozzle is thus able to dynamically compensate for changes in operating temperature in order to maintain a substantially constant flow.

For instance, the flow area may generally comprise a flow passage through which the incompressible fluid flows in use.

The flow passage may be defined at least in part by the deformable element. For example, the deformable element may comprise an annular (or semi-annular) element defining (i.e. surrounding) at least a portion of the flow passage. The deformable element may thus define a flow orifice of the flow control nozzle. The SMA material may thus constrict as the temperature increases to reduce the flow area. Particularly, the SMA material may constrict as the temperature increases to reduce the diameter of the flow passage. Thus, in embodiments, the diameter of the flow control nozzle is adjusted to compensate for variations in the operating temperature (fluid viscosity). Although the flow passage will typically have a circular cross section, it will be appreciated that the flow passage may also have other shaped cross sections. Thus, generally, any reference to a "diameter" of the flow passage may be considered as a reference to a "dimension" of the flow passage. That is, in embodiments, the flow area may comprise a flow passage, wherein the flow passage is defined at least in part by the deformable element, and wherein the SMA material is configured to reduce a dimension of the flow passage to reduce the flow area.

The length of the flow control nozzle, e.g. or of the flow passage thereof, may also in principle be adjusted to provide further control over the flow rate. However, typically, the length of the flow control nozzle remains constant.

In another example, the dimensions of the flow orifice may be fixed, and the deformable element may be disposed within the flow area, wherein the deformable element deforms as the temperature increases to reduce the flow area. That is, the flow area may comprise a flow passage, e.g. formed from steel or similar, having fixed dimensions, with the flow area then being varied using a deformable element located within the flow passage. In this case, the fluid may flow annularly around the deformable element. The deformable element may thus expand or move or otherwise deform to adjust (e.g. reduce) the flow area. So, in embodiments, the flow area may comprise a flow passage, wherein the deformable element is disposed within the flow area so that fluid flows around the deformable element through the flow passage. The deformable element can then deform as the temperature increases to reduce the flow area.

Thus, it will be appreciated that the SMA material generally allows the flow control nozzle to dynamically (automatically) adjust the flow area within the range of operating temperatures in order to control the flow rate. For instance, as the operating temperature increases, the SMA material may be configured to automatically reduce the flow area of the flow control nozzle.

The flow control nozzle is used for controlling the flow of a generally incompressible fluid such as a hydraulic fluid or a fuel. Typically, the flow control nozzle is used for providing a laminar flow. That is, the flow control nozzle may be configured for controlling the flow of an incompressible fluid under laminar flow conditions. It will be appreciated that the effect of fluid viscosity on a laminar flow of incompressible fluid is generally well understood and may be modelled or described using a suitable known relationship. Thus, in embodiments, the SMA material may be configured to change the flow area of the flow control nozzle according to a predetermined relationship for laminar flow conditions to maintain a substantially constant laminar flow over the range of operating temperatures. For instance, the SMA material may be characterised, e.g. during manufacture, to suitably deform at least over the range of operating temperatures in order to control the flow area in use according to a desired relationship. For example, in some embodiments, the SMA material may be configured to reduce a diameter of flow control nozzle according to the relationship $$d_2 = d_1 \left(\frac{v_2}{v_1}\right)^{0.25}$$

where:
$d_2$=compensated nozzle diameter for operating temperature;
$d_1$=nozzle diameter at reference temperature;
$v_2$=viscosity at operating temperature; and
$v_1$=viscosity at reference temperature.

In embodiments, a method is provided for controlling a flow of incompressible fluid using a flow control nozzle substantially as described herein. The method may comprise passing the incompressible fluid through the flow control nozzle to maintain substantially constant laminar flow conditions over the range of operating temperatures.

The range of operating temperatures may comprise from about 0 to about 100 degrees Celsius. That is, the flow control nozzle may be configured to compensate the flow area at least within this range of operating temperatures. However, in principle, the flow control nozzle may be configured to compensate the flow area over any suitable range of operating temperatures, as desired, e.g. depending on the application. Thus, other temperature ranges may also be configured.

In general, any suitable SMA materials, as are generally known in the art, may be used, as desired (e.g. depending on the application and operating temperature range). For example, in embodiments, a Nickel-Titanium alloy such as Nitinol may be used. Other suitable Nickel-Titanium alloys may include alloys of Nickel-Titanium-Iron (e.g. Tinel®), Nickel-Titanium-Niobium or Nickel-Titanium-Copper. Various alloys of Iron-Manganese-Silicon, Copper-Zinc-Aluminium or Copper-Aluminium-Nickel may also suitably be used in some embodiments.

The flow control nozzle may comprise part of a jet pipe servo valve. Thus, in embodiments there is provided a jet pipe servo valve comprising a flow control nozzle substantially as described herein. Particularly, the flow control nozzle may comprise a flow control nozzle of the jet pipe of the jet pipe servo valve. There is also provided a method of controlling such jet pipe servo valve. The method may comprise passing hydraulic fluid through a jet pipe and using the hydraulic fluid to control a servo valve.

As another example, the flow control nozzle may comprise part of a fuel injector, e.g. for a diesel engine. Thus, in other embodiments there is provided a fuel injector comprising a flow control nozzle substantially as described herein. There is also provided a diesel engine comprising such fuel injector and a method of injecting fuel using such fuel injector.

However, it will be appreciated that the flow control nozzles described herein may generally find application in any systems where it is desired to control the flow of an incompressible fluid where the flow rate is sensitive to changes in temperature.

From another aspect there is provided a method of manufacturing a flow control nozzle substantially as described herein, the flow control nozzle having a flow area and comprising a deformable element comprising a SMA material, the method comprising training the SMA material within a range of operating temperatures so that the SMA material is configured to reduce the flow area of the flow control nozzle as the operating temperature increases.

For instance, training the SMA material may comprise subjecting the SMA material to different mechanical deformations at different temperatures within the range of operating temperatures.

As mentioned above, the SMA material may be trained so as to reduce the flow area of the flow control nozzle according to a predetermined relationship for laminar flow conditions to maintain a substantially constant laminar flow over the range of operating temperatures. For example, in embodiments, the SMA material may be trained so as to reduce a diameter of flow control nozzle according to the relationship presented above.

DRAWINGS

Various arrangements and embodiments will now be described, by way of example only, and with reference to the accompanying drawings in which:

FIG. 1 shows an example of a typical jet pipe servo valve;
FIG. 2 shows an example of a flow nozzle according to the present disclosure;
FIG. 3 illustrates a relationship between kinematic viscosity and temperature for an exemplary hydraulic fluid;
FIG. 4 illustrates the required viscosity compensation factor for the fluid shown in FIG. 3;
FIG. 5 illustrates how the nozzle diameter may be controlled as a function of temperature to compensate for the variation in kinematic viscosity;
FIG. 6 illustrates how the nozzle flow may be maintained substantially constant according to the present disclosure; and
FIG. 7 shows another example of a flow nozzle according to the present disclosure.

DESCRIPTION

The present disclosure provides a novel approach for maintaining a substantially constant flow through a nozzle with variations in temperature. Particularly, the present disclosure uses SMA material to vary the flow area through the nozzle to compensate for changes in fluid viscosity at different temperatures. SMA materials are a class of materials whose properties change with temperature. For example, at low temperatures, the SMA may take a more flexible form, referred to as the "martensitic" state. At high(er) temperatures, the SMA material changes state to a more rigid form, referred to as the "austenitic" state. SMA materials with two-way memory can thus have both high and low temperature shapes, and can move between them as the temperature changes. For instance, suitable SMA materials for use in embodiments may include Nickel-Titanium alloys such as those sold under the trade name "Nitinol". However, it will be appreciated that various other SMA materials may suitably be used.

The SMA material may thus be 'trained' or characterised during manufacture by subjecting the SMA to a series of mechanical deformations whilst it is being heated. The SMA material retains knowledge of the deformations at the different temperatures so that when the SMA material is subsequently heated to a certain temperature (e.g. in use), the SMA material returns to a particular mechanical state. In this way, the SMA material may be configured to deform in a controlled fashion as a function of temperature.

In order to illustrate the present disclosure, FIG. 1 shows an example of a typical jet pipe servo valve 10. As shown, the jet pipe servo valve 10 comprises a jet nozzle 20 and a second stage spool 30 downstream of the jet nozzle 20. The impingement of hydraulic fluid flowing through the jet nozzle 20 thus provides pressure for moving the second stage spool 30. In typical jet pipe servo valves, the jet nozzle has a fixed diameter. Accordingly, any changes in fluid viscosity, e.g. due to a change in operating temperature, will result in changes to the flow rate through the jet nozzle. This can degrade the performance of the jet pipe servo valve. Thus, it may be desirable to provide a more constant flow.

FIG. 2 shows an example flow control nozzle 40 according to an embodiment. The flow control nozzle 40 may comprise a jet nozzle 20 of a jet pipe servo valve 10, as described above (although other arrangements are of course possible). In FIG. 2 the flow control nozzle 40 is comprised of SMA material 50. Particularly, as shown, the SMA material 50 surrounds and thus defines a flow passage 51 extending through the flow control nozzle. For instance, the SMA material 50 may be arranged annularly around the flow passage 51. The flow passage 51 thus determines the flow rate through the flow control nozzle 40.

That is, in FIG. 2, the flow passage 51 through the flow control nozzle 40 is defined by the SMA material 50. The flow passage 51 defines the nozzle length (L) and the nozzle diameter (d). The SMA nozzle 40 is produced so that at the minimum operating temperature the passage 51 is oversized to enable a desired flow at the increased fluid viscosity. During manufacture, the nozzle may then be mechanically deformed (i.e. squashed) while being heated to the maximum operating temperature so that the nozzle diameter progressively decreases in size to present a smaller orifice required to maintain the desired flow over the entire range of operating temperatures. For instance, using a series of forming rods of progressively decreasing size, the SMA material can be squashed onto the appropriately sized forming rod for a particular operating temperature to achieve the desired behaviour. In this way, the SMA material can be effectively trained in order to compensate the nozzle diameter for fluid viscosity effects over the desired operational temperature range.

Thus, the nozzle diameter can be controlled in order to maintain a substantially constant flow across a range of operating temperatures.

For instance, typically, the flow device is used for laminar flow control. For laminar flow conditions, the flow, Q, through the nozzle is given by (Equation 1):

$$Q = \frac{\pi d^4}{128 \rho v L} \Delta P$$

where:
d=the diameter of the nozzle;
L=the length of the nozzle;
v=the kinematic viscosity of the fluid;
ρ=the density of the fluid; and
ΔP=the pressure drop across the nozzle.

In most cases, the fluid density (p), nozzle length (L) and pressure drop (ΔP) are substantially constant. On the basis that the flow (Q) is also constant, or is desired to be constant, Equation 1 can be re-formulated in terms of a constant, K, as (Equation 2):

$$\frac{d^4}{v} = K$$

therefore:

$$\frac{d_1^4}{v_1} = \frac{d_2^4}{v_2}$$

which can be re-arranged to give (Equation 3):

$$d_2 = d_1 \left(\frac{v_2}{v_1}\right)^{0.25}$$

where:
$d_2$=compensated nozzle diameter for operating temperature;
$d_1$=nozzle diameter at reference temperature;
$v_2$=viscosity at operating temperature; and
$v_1$=viscosity at reference temperature.

Thus, for the geometry of FIG. 2, wherein the nozzle diameter is defined by the SMA material, by suitably designing or training the SMA material based on the relationship given in Equation 3 to adjust the diameter of the nozzle in use it is possible for the flow control nozzle to automatically compensate for changes in viscosity and maintain a substantially constant flow over a range of operating temperatures.

An example of this will now be described with regard to a flow device controlling a flow of the commonly used hydraulic fluid "Mil-H-83282" having a fluid density (p) of 850 kg/m³, and a kinematic viscosity at a reference temperature of 40° C. of 12.7 cSt (0.127 cm²/s) through a flow nozzle having a nozzle diameter ($d_1$) at the reference temperature of 0.007 inches (0.18 mm), a nozzle length (L) of 0.1 inch (2.54 mm), and a pressure drop (ΔP) of 3000 psi (21 MPa).

$$K \cdot v = \left(\frac{v_2}{v_1}\right)^{0.25}$$

Figure 5:
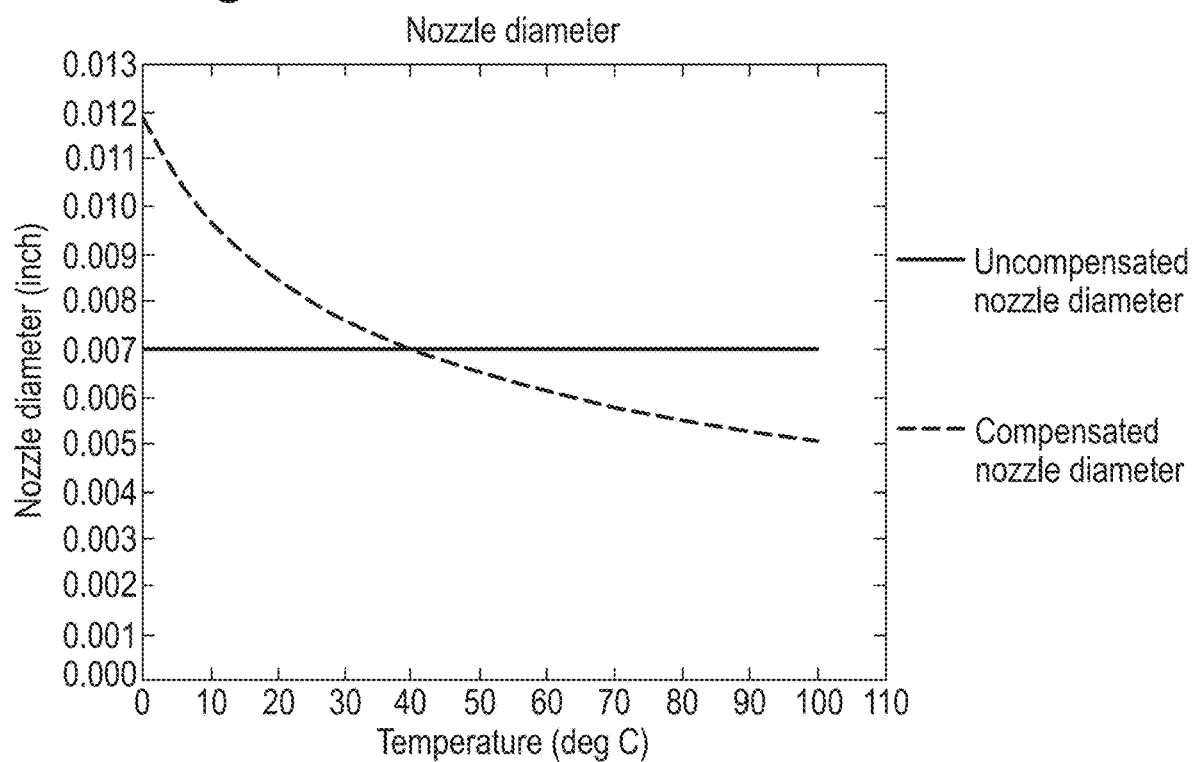

FIG. 5 shows the required nozzle diameters to compensate for the change in viscosity over the temperature range. The required nozzle diameters may be determined based on Equation 3.

Figure 6:
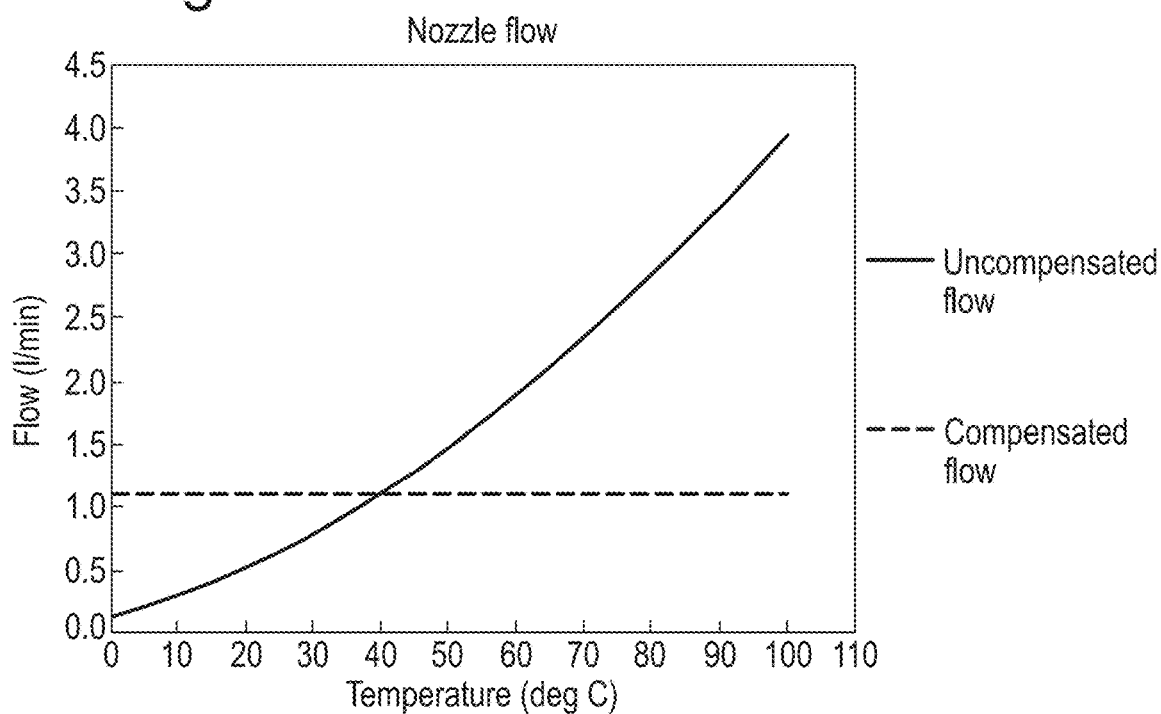

FIG. 6 shows how the nozzle flow can be compensated accordingly in this way. Also plotted for reference in FIGS. 5 and 6 respectively are the uncompensated (i.e. constant) nozzle diameter and uncompensated flow.

Thus, from FIGS. 5 and 6 it can be seen that (due to the fourth power dependence on nozzle diameter in Equation 1) the flow can be maintained substantially constant over a wide range of operating temperatures with only relatively fine adjustments of the nozzle diameter (i.e. in the example between about 0.005 and 0.012 inches (0.127 and 0.3048 mm)).

Although embodiments have been described above wherein the flow is controlled by adjusting the nozzle diameter, with the nozzle length remaining fixed, it will be appreciated that in principle the SMA material may also be used to adjust the nozzle length, i.e. based on the equality:

$$\frac{d_1^4}{v_1 L_1} = \frac{d_2^4}{v_2 L_2}$$

However, it will be appreciated that because the nozzle diameter scales with the fourth power, even relatively small adjustments in nozzle diameter can adjust for a wide range of operating temperatures. Also, adjusting the nozzle length may not always be desirable, e.g. when the flow device is to be incorporated in-line within a larger system. Thus, in embodiments, the nozzle length may be fixed.

It will also be appreciated that various other arrangements for controlling the flow area are of course possible.

Figure 7:
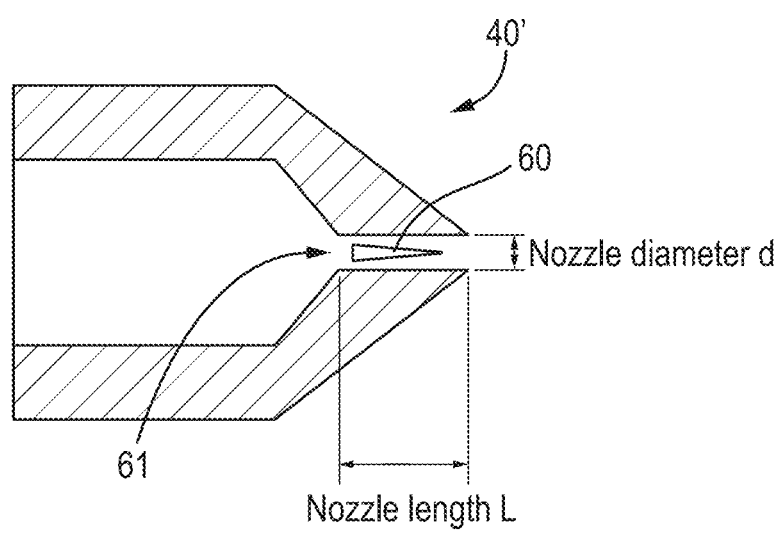

For instance, FIG. 7 shows an example of a flow nozzle 40' according to another embodiment wherein instead of forming the nozzle orifice from SMA material, a deformable element 60 such as a tapered needle is positioned within a flow passage 61 through the flow control nozzle 40' with the deformable element 60 comprising or being connected to a suitable SMA material and configured to deform in use to reduce the flow area through the nozzle as a function of temperature. In this case, the fluid flows annularly around the deformable element 60 through the flow passage 61. The nozzle diameter may thus be fixed, and the flow area controlled by deformations of the deformable element.

Particularly, as the operating temperature increases, the deformable element 60 may be configured to expand in order to reduce the flow area, and thus compensate for the decreased viscosity. In this case, similar equations can be derived as above in order to determine the required expansion needed to compensate for the changes in fluid viscosity over the operating temperature range to maintain a more constant flow.

Figure 1:
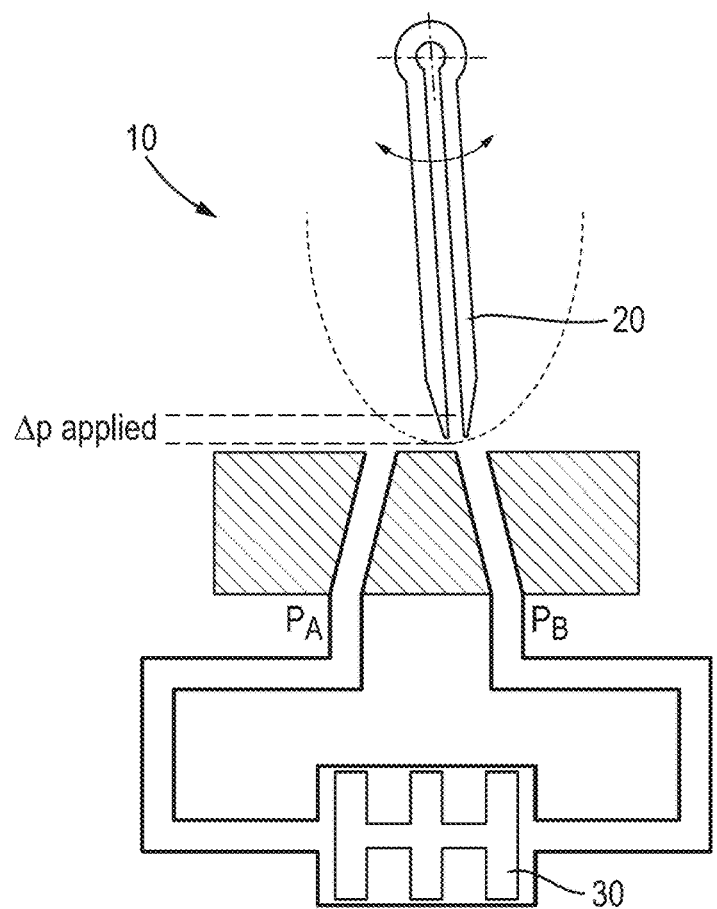
Figure 2:
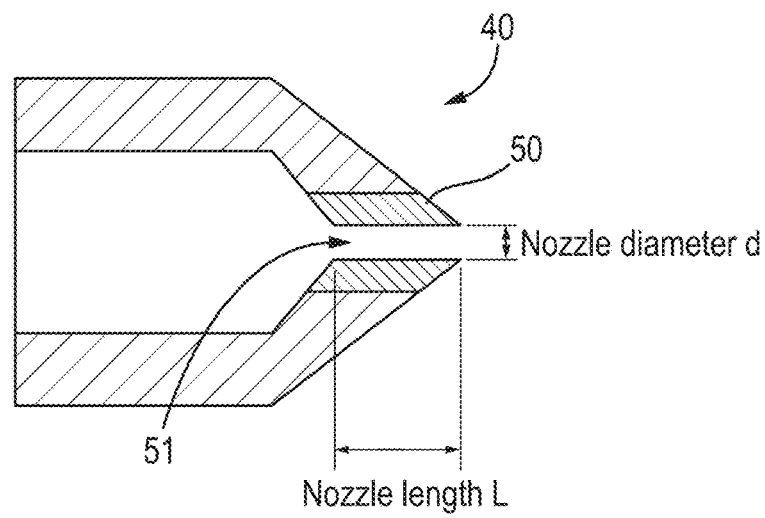
Figure 3:
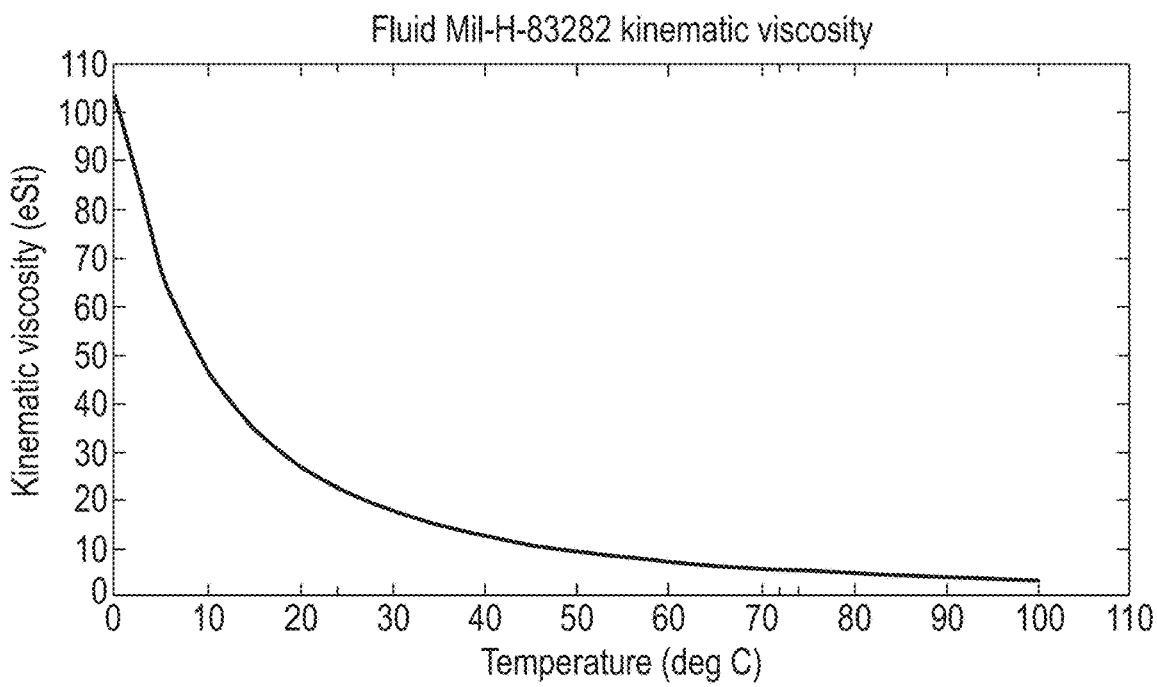
FIG. 3 shows the variation in kinematic viscosity of the Mil-H-83282 fluid as a function of temperature. As shown, there is a significant drop in viscosity over the temperature range 0 to 100° C.
Figure 4:
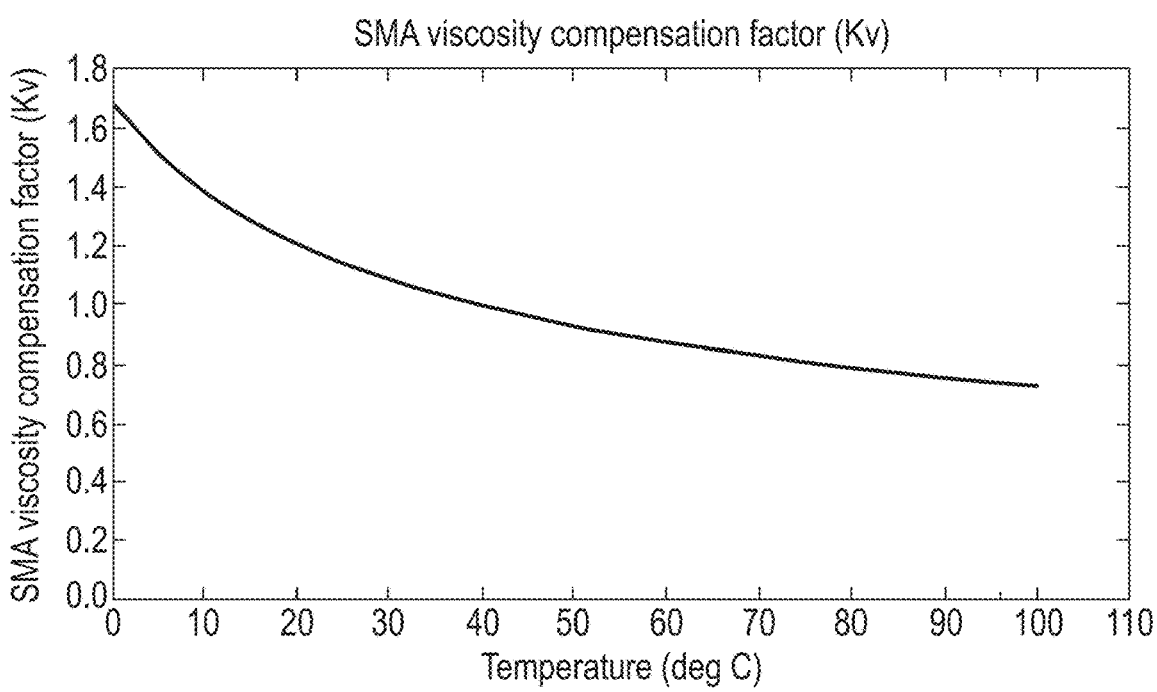
FIG. 4 shows the viscosity compensation factor (K.v) required for compensating this to maintain a constant flow, wherein the viscosity compensation factor as shown in FIG. 4 is defined based on Equation 1 (assuming that the parameters Q, ρ, ΔP and L are constant) in terms of the viscosities at the reference and operating temperatures, $v_1$ and $v_2$, as (Equation 4)

Although various examples have been presented above in relation to a jet pipe servo valve, it will be appreciated that the flow control nozzles described herein are not limited to this context and may generally find utility in various other applications where it is desired to control a fluid flow. For instance, among other examples, the flow control nozzles described herein may be used as a fuel control nozzle of a fuel injector within a diesel engine and indeed the flow control nozzles shown in either FIG. 2 or FIG. 7 may thus comprise fuel injector nozzles. That is, it will be apparent that the techniques presented herein may generally be applied to any flow control nozzles, and are not limited e.g. to jet pipe servo valves.

Thus, although the techniques presented herein have been described with reference to particular embodiments, it will be understood by those skilled in the art that various changes in form and detail may be made without departing from the scope of the accompanying claims.

The invention claimed is:

1. A flow control nozzle for controlling the flow of an incompressible fluid, the flow control nozzle having a flow area and comprising a deformable element comprising a shaped memory alloy (SMA) material wherein within a range of operating temperatures the SMA material is configured to reduce the flow area of the flow control nozzle as the operating temperature increases;
wherein the SMA material is configured to reduce the flow area of the flow control nozzle according to a predetermined relationship for laminar flow conditions to maintain a substantially constant laminar flow over the range of operating temperatures; and
wherein the SMA material is configured to reduce a diameter of flow control nozzle according to the relationship $$d_2 = d_1 \left(\frac{v_2}{v_1}\right)^{0.25}$$

where:
$d_2$=compensated nozzle diameter for operating temperature;
$d_1$=nozzle diameter at reference temperature;
$v_2$=viscosity at operating temperature; and
$v_1$=viscosity at reference temperature.

2. The flow control nozzle of claim 1 wherein the SMA material is configured to reduce the flow area of the flow control nozzle as the operating temperature increases in order to maintain a substantially constant flow rate over the range of operating temperatures.

3. The flow control nozzle of claim 1, wherein the flow area comprises a flow passage, wherein the flow passage is defined at least in part by the deformable element, and wherein the SMA material is configured to reduce a dimension of the flow passage to reduce the flow area.

4. The flow control nozzle of claim 1, wherein the flow area comprises a flow passage, and wherein the deformable element is disposed within the flow area so that fluid flows around the deformable element through the flow passage, and wherein the deformable element deforms as the operating temperature increases to reduce the flow area.

5. The flow control nozzle of claim 1, wherein the range of operating temperatures is from about 0 to about 100 degrees Celsius.

6. The flow control nozzle of claim 1 wherein the SMA material comprises a Nickel-Titanium alloy.

7. A jet pipe servo valve comprising the flow control nozzle as claimed in claim 1.

8. A fuel injector comprising:
the flow control nozzle as claimed in claim 1.

9. A method of controlling a flow of incompressible fluid using the flow control nozzle as claimed in claim 1, the method comprising:
passing the incompressible fluid through the flow control nozzle to maintain substantially constant laminar flow conditions over a range of operating temperatures.

10. A method of manufacturing the flow control nozzle as claimed in claim 1, the flow control nozzle having the flow area and comprising the deformable element comprising the SMA material, the method comprising:
training the SMA material within the range of operating temperatures so that the SMA material is configured to reduce the flow area of the flow control nozzle as the operating temperature increases;
wherein the SMA material is trained so as to reduce the flow area of the flow control nozzle according to a predetermined relationship for laminar flow conditions to maintain a substantially constant laminar flow over the range of operating temperatures;
wherein the SMA material is trained so as to reduce a diameter of flow control nozzle according to the relationship $$d_2 = d_1 \left(\frac{v_2}{v_1}\right)^{0.25}$$

where:
d2=compensated nozzle diameter for operating temperature;
d1=nozzle diameter at reference temperature;
v2=viscosity at operating temperature; and
v1=viscosity at reference temperature.

11. The method of claim 10, wherein training the SMA material comprises subjecting the SMA material to different mechanical deformations at different temperatures within the range of operating temperatures.

* * * * *